United States Patent [19]

Cole, Jr. et al.

[11] 4,359,398

[45] Nov. 16, 1982

[54] LIQUID CRYSTAL COMPOSITIONS WITH NOVEL TRIS-AZO DICHROIC DYES

[75] Inventors: Herbert S. Cole, Jr., Scotia; Siegfried Aftergut, Schenectady, both of N.Y.

[73] Assignee: General Electric Company, Schenectady, N.Y.

[21] Appl. No.: 219,087

[22] Filed: Dec. 22, 1980

[51] Int. Cl.³ .................. G02F 1/13; C09K 3/34; C09B 31/16
[52] U.S. Cl. .................. 252/299.1; 350/349; 260/169
[58] Field of Search ............ 252/299.1; 260/169, 260/173; 350/349

[56] References Cited

U.S. PATENT DOCUMENTS

| | | | |
|---|---|---|---|
| 4,116,861 | 9/1978 | Aftergut et al. | 252/299.1 |
| 4,122,027 | 10/1978 | Cole, Jr. et al. | 252/299.1 |
| 4,128,496 | 12/1978 | Cole, Jr. et al. | 252/299.1 |
| 4,128,497 | 12/1978 | Cole, Jr. et al. | 252/299.1 |
| 4,137,143 | 1/1979 | Osmam | 252/299.1 |
| 4,141,627 | 2/1979 | Bloom et al. | 252/299.1 |
| 4,145,114 | 3/1979 | Coates et al. | 252/299.1 |
| 4,153,343 | 5/1979 | Bloom et al. | 252/299.1 |

FOREIGN PATENT DOCUMENTS 55-127485  10/1980  Japan ................. 252/299.1

OTHER PUBLICATIONS

Cox, R. J.; Mol. Cryst. Liq. Cryst., vol. 55, pp. 1–32 (1979).
Bloom, A., et al.; Mol. Cryst. Liq. Cryst., vol. 40, pp. 213–221 (1977).
Bloom, A., et al.; Mol. Cryst. Liq. Cryst. (Lett.), vol. 41, pp. 1–4 (1977).
White, D. L., et al., J. Appl. Phys., vol. 45, No. 11, pp. 4718–4723 (1974).

*Primary Examiner*—Teddy S. Gron
*Attorney, Agent, or Firm*—William A. Teoli; James C. Davis, Jr.

[57] ABSTRACT

Novel tris-azo dyes and a liquid crystal composition containing the tris-azo dyes. The tris-azo dyes are of the general formula:

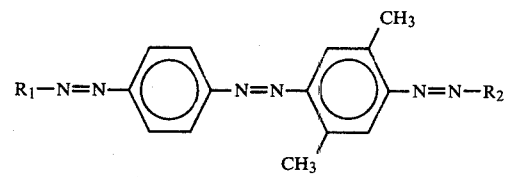

wherein $R_1$ and $R_2$ are various aromatic groups including aromatic amines, substituted aromatic amines, hydroxy-substituted aromatic groups and substituted hydroxy-containing aromatic groups. When the tris-azo dichroic dyes are used as a guest dye in a host liquid crystal material, they form a novel liquid crystal composition for use in liquid crystal displays.

8 Claims, No Drawings

LIQUID CRYSTAL COMPOSITIONS WITH NOVEL TRIS-AZO DICHROIC DYES

BACKGROUND OF THE INVENTION

This invention relates to liquid crystal compositions, and, more particularly, to dichroic liquid crystal compositions containing tris-azo dichroic dyes.

Dyes having improved properties are desirable for various applications, including the dyeing of textiles, the coloring of plastics and the coloring of liquid crystal displays. Among those properties which are desirable for dyes, especially for dyes used in liquid crystal displays, are photostability of the dye, suitable extinction coefficient of the dye, solubility of the dye in liquid crystal hosts, orientability of the dye in liquid crystal hosts and light absorption in the desired spectral region. In liquid crystal displays, certain colors of dyes are especially useful for modifying the color of other dyes or as additives for black dichroic dye formulations, and the like. Thus, it is particularly important to provide dyes which have maximum light absorption at certain wavelengths in order to modify appropriately a color of a dye or as an additive for black dichroic dye formulations, especially those to be used in liquid crystal displays. To obtain the desired light absorption at a particular wavelength, or to obtain maximum absorption at a particular wavelength, it is often desirable to modify dye molecules so that there is maximum absorption of light radiation at a particular wavelength or at a number of wavelengths, e.g., black dichroic dyes for liquid crystal displays. To shift the wavelength, various groups may be incorporated upon particular dye molecules to cause a bathochromic shift in the light absorption to achieve the desired light absorption. All of this is preferably accomplished without adding substituents which affect the solubility of the dye, especially the solubility of the dye in a liquid crystal formulation, and without significant impact upon other desirable properties of the dyes used in liquid crystal displays.

The fabrication of black liquid crystal displays poses a particular problem in that no black dichroic dyes are known, and black liquid crystal displays are made by mixing dichroic dyes of various colors in proper proportions to obtain a material which absorbs light radiation in the spectral range of about 400–700 nm resulting substantially in a black color. Thus, a bathochromic shift in a particular dye or dyes can improve the absorption in light radiation in the appropriate spectral range to improve the black color by shifting the wavelength of maximum absorption to a longer wavelength. The bathochromic shift can result in a more saturated color, and when intensity and greater contrast are required, it is desirable to achieve a bathochromic shift which will result in a more saturated color. In the case of the black dichroic formulations for liquid crystal displays, it is desirable to provide more saturated blue colors. Thus, for the black formulations, the bathochromic shift is important at the 600 nm end of the spectrum because there are few suitable dichroic dyes having a maximum absorption above 600 nm which are soluble in liquid crystal host materials, and have other desirable properties for use in formulations used for liquid crystal displays. Many of the prior art dyes, e.g., the ionic dyes, having a maximum absorption of light radiation above 600 nm are insoluble in liquid crystal formulations and cannot be used to color such displays.

Dichroic dyes having three azo (—N═N—) bonding groups and having suitable order parameters, S, greater than 0.70 are disclosed in the present inventors' U.S. Pat. No. 4,122,027. The high order parameter dichroic dyes in U.S. Pat. No. 4,122,027 are 4,4'-bis-(substituted naphthylazo) azobenzenes having a generic chemical formula as follows:

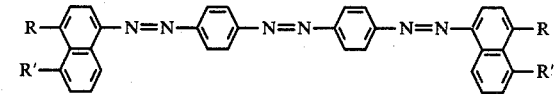

wherein R and R' are (among others) hydrogen and alkylamines, e.g. —NHC$_2$H$_5$, substituents. Although the foregoing dyes of U.S. Pat. No. 4,122,027 are suitable for coloring liquid crystal mixtures and have adequate properties, e.g., solubility, for use in liquid crystal displays, it is always desirable to improve those properties and to provide azo dyes having more intense or saturated colors especially at wavelengths over 600 nm.

Dichroic liquid crystal mixtures, each having a liquid crystal material and at least one dichroic dye dissolved therein, the dichroic dye having a plurality of azo (—N═N—) bonding groups and characterized by an order parameter, S, greater than 0.65 and by a maximum absorption wavelength in the range of about 495 nm to about 620 nm, are disclosed in the inventors' U.S. Pat. No. 4,128,497. Tris-azo dichroic dyes dissolved in liquid crystal material disclosed in the patent are those having the following general chemical formula:

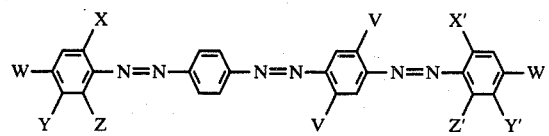

wherein V, W, X, Y, Z, X', Y' and Z', can be selected from various substituents including various specific combinations of hydrogen, —CH$_3$, —N(CH$_3$)$_2$, (C$_2$H$_5$)$_2$N— and —OH. The dye where V is methyl; X, Y, Z, X', Y' and Z' are hydrogen, and W is dimethylamino gives redish shades in liquid crystal hosts and is therefore not useful for blue displays. In the foregoing formula, Y' and Z' and Y and Z can form a benzene ring structure with the respective ring to which they are attached and thereby form a naphthyl end or terminal group on one end or both ends of the tris-azo dye. Although the dyes of U.S. Pat. No. 4,128,497 can be dissolved in liquid crystal compositions to form liquid crystal displays of suitable colors, it is always desirable to improve the colors of dichroic dyes used in liquid crystal compositions, especially to provide dyes, the absorption band of which lies at longer wavelengths due to the shift of the wavelength region and thereby provide more saturated colors, especially more saturated blue colors, without sacrifice of the solubility of the dye in the liquid crystal, and preferably increasing the solubility of the dye in the liquid crystal composition.

Other dye compounds suitable for use in solution with a liquid crystal material and containing azo linkages, including the tris-azo dyes, are well-known in the prior art. In U.S. Pat. No. 4,145,114, a substantial number of dye compounds are proposed for use in liquid crystal materials. The classes of azo or azoxy dyes in U.S. Pat. No. 4,145,114 have the following general formula:

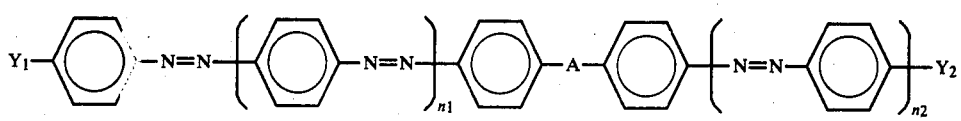

or a substituted derivative of the foregoing formula in which any one of the positions on any one of the benzene rings is substituted by halogen, methyl, halomethyl, or methoxy; wherein A is an azo or azoxy linkage group; $n_1$ and $n_2$ are each integers of 0 to 4; and $Y_1$ and $Y_2$ are each one of the following groups: hydrogen; OR wherein R is an alkyl or arylalkyl group; or a group having the following formula:

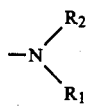

where $R_2$ and $R_1$ are each one of the following: an alkyl group, a substituted alkyl group or an alkylene group forming a reduced heteroaromatic system with the terminal aromatic ring. Although pleochroic dyes of the above formula are proposed in U.S. Pat. No. 4,145,114, there is no evidence therein that any unusual properties of a segment of the dyes covered by the general formulas were uncovered or suggested with respect to the tris-azo dyes having methyl substituents in the 2-and 5-positions upon one of the benzene rings adjacent the "A" moiety joining two benzene rings even though U.S. Pat. No. 4,145,114 discloses that any one of the positions on any one of the benzene rings may be substituted by a methyl. Although numerous pleochroic dyes are proposed in U.S. Pat. No. 4,145,114, it is always desirable to improve azo dyes and to improve liquid crystal displays containing azo dyes. To that end, it is desirable to select specific characteristics, compositions and conditions within such broadly proposed fields of the prior art to improve thereon, and specifically, to improve classes of azo dyes and to improve liquid crystal displays containing such classes of azo dyes.

The present inventors have disclosed in copending application Ser. No. 164,254, filed June 30, 1980, certain tris-azo dyes for use in liquid crystal displays which are of the formula

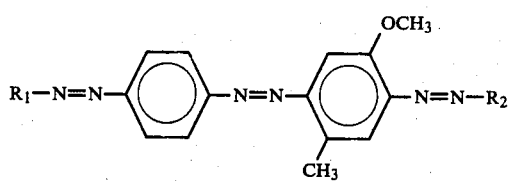

in which $R_1$ and $R_2$ can be aminoquinoline, tetrahydroquinoline, substituted and unsubstituted phenyl and naphthyl amines, hydroxy or N-cyclic group substituted phenyl groups, hydroxy, amino, alkoxy or alkyl substituted naphthyl groups, or julolidene. The dye where $R_1$ and $R_2$ are 4-ethylaminonaphthyl has better solubility in conventional liquid crystal host E-7 than the same dye without the 2,5-dimethyl substituent (disclosed in U.S. Pat. No. 4,122,027) and has a higher order parameter of 0.75.

Accordingly, it is the primary object of the present invention to provide tris-azo dyes having a novel chemical composition.

It is another object of the present invention to provide novel liquid crystal compositions for use in liquid crystal displays.

Another object of the present invention is to provide tris-azo dyes having improved properties without sacrificing the solubility of the dyes in liquid crystals.

Another object of the present invention is to provide improved dichroic liquid crystal displays made by mixing dichroic dyes having more saturation at longer wavelengths and improved solubility in the liquid crystal composition.

Yet another object of the present invention is to provide dichroic dyes which tend to have a bathochromic shift with respect to the tris-azo dyes of the prior art.

Still another object of the present invention is to provide a class of tris-azo dyes, the absorption head of which lies at longer wavelengths because the shift in that wavelength region yields more saturated blue colors.

Another object of this invention is to provide improved black dichroic liquid crystal displays made by mixing dichroic dyes of various colors and to provide a method of improving the black color of dichroic dyes used in black liquid crystal displays.

Other objects and advantages of the invention will become apparent as the description thereof proceeds.

These and other objects of the invention are achieved by providing tris-azo dyes having the general formula:

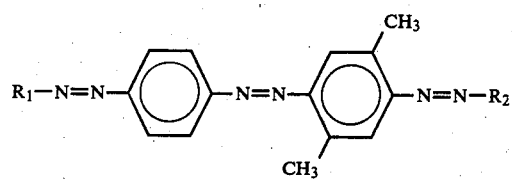

wherein $R_1$ and $R_2$ are selected from the group consisting of:
(I) aminoquinoline;
(II) tetrahydroquinoline;
(III) aromatic amines and substituted aromatic amines having the formula:

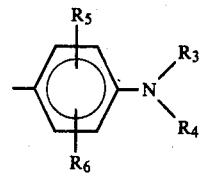

wherein $R_3$ is an alkyl group having from about 1 to 6 carbon atoms, aryl, arylalkyl, or alkyl amine wherein the alkyl is about 1 to 6 carbon atoms or hydrogen; $R_4$ is an alkyl group having from about 1 to 6 carbon atoms, alkyl amine wherein the alkyl is about 1 to 6 carbon atoms, or hydrogen; $R_5$ is an alkyl having from about 1 to 3 carbon atoms, alkoxy, halogen, or hydrogen; and R$_6$ is an alkyl group having from about 1 to 3 carbon atoms hydroxy, alkoxy, halogen or hydrogen, provided that when R$_5$, R$_6$ and one of R$_5$ or R$_4$ are hydrogen and the other is alkyl, the alkyl group has 2-6 carbons;

(IV) aromatic amines and substituted aromatic amines having the formula:

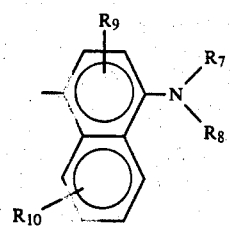

wherein R$_7$ is hydrogen, an alkyl group having from about 1 to 6 carbon atoms, aryl, arylalkyl or alkyl amine wherein the alkyl is about 1 to 6 carbon atoms and aryl is phenyl or naphthyl; R$_8$ is hydrogen, an alkyl group having from about 1 to 6 carbon atoms, or alkyl amine wherein the alkyl is from about 1 to 6 carbon atoms; and R$_9$ is hydrogen; alkyl having from about 1 to 3 carbon atoms, alkoxy or halogen; and R$_{10}$ is hydrogen; alkyl having from about 1 to 3 carbon atoms, alkoxy or halogen;

(V) substituted phenyl having the formula:

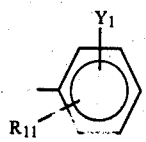

wherein Y$_1$ is hydroxy, or N-containing cyclic groups selected from the group consisting of piperidine, piperazine, dimethylpyrazole, morpholine and carbazole bonded to the phenyl ring through the nitrogen atom in the cyclic molecule; and R$_{11}$ is an alkyl group having from 1 to 3 carbon atoms, hydrogen, halogen, alkoxy, or alkyl amine wherein the alkyl group is about 1 to 6 carbon atoms;

(VI) substituted naphthalene having the formula:

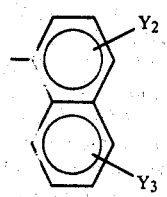

wherein Y$_2$ is hydroxy or amino (—NH$_2$), and Y$_3$ is hydrogen, amine (—NH$_2$), hydroxy, alkoxy, alkyl having about 1 to 3 carbon atoms or alkyl amine wherein the alkyl is about 1 to 6 carbon atoms; and (VII) hydroxy julolidene:

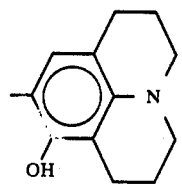

The foregoing terminal groups are illustrated in the form of the organic radical, and the terminal group links to or joins the azo group at the bond generally shown in the para position of the terminal group.

The foregoing dyes have three azo (—N=N—) linking groups, one of the azo linking groups joining an unsubstituted benzene ring and a benzene ring having methyl groups substituted in the 2-position and in the 5-position of the benzene ring. The other two azo groups join the unsubstituted and the dimethyl-substituted benzene ring at the para position to a third and fourth substituent, designated as R$_1$ and R$_2$ respectively, in the general formula of the dye. The third and fourth substituents joined to the second and third azo groups are substituted aromatic or aryl compounds, e.g., naphthalene, or one of the third and fourth substituents is hydrogen and the other substituent is substituted aromatic or aryl compound. The substituted aromatic or aryl terminal groups (designated by R$_1$ and R$_2$ in the general dye formula) are auxochromes, i.e., electron-withdrawing groups or electron-repelling groups. The terminal groups of the class of dyes discovered herein generally produce a bathochromic shift when they are present upon the dye molecule having methyl groups substituted at the 2- and 5-positions of the benzene ring as shown in the general formula for the dyes of this invention. This bathochromic shift is particularly important for dyes, the absorption band of which lies at longer wavelengths, for example, those wavelengths approaching 590 nm and above, because the shift in that wavelength region yields more saturated blue colors. Furthermore, the tris-azo dyes of the present invention having substituted aromatic groups as terminal end groups upon the joining or connecting azo groups tend to be more soluble because of the methyl group substituted in the 2- and 5-positions upon the benzene ring.

In accordance with the present invention, there is also provided a liquid crystal composition for use in a liquid crystal display, comprising, a host liquid crystal material; and a guest dye dissolved in the host liquid crystal material, the dye having the general formula and the preferred substituted aromatic groups, namely, substituted benzene and substituted naphthalene, as discussed above. The unique and novel class of tris-azo dyes of the present invention must have methyl groups substituted in the 2-position and in the 5-position of a benzene ring adjacent to the central or intermediate azo group of the dye molecule and at least one substituted aromatic group upon a terminal azo group in the tris-azo dye. It is the synergism between the methyl groups substituted in the 2-position and in the 5-position in the benzene ring adjacent the center azo group and the terminal substituted aromatic group or groups which result in the improved tris-azo dyes of the present invention and the improved liquid crystal composition for use in a liquid material and the improved guest dichroic dyes of the present invention.

These and various other objects, features and advantages of the invention can be best understood from the following detailed description.

The tris-azo dyes or guest dichroic tris-azo dyes of the present invention have been synthesized by a reaction which produces the following general formula representing the class of tris-azo dyes:

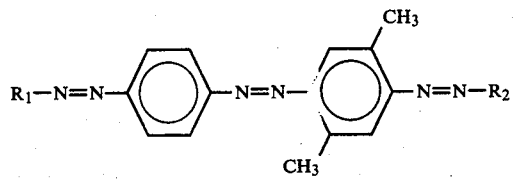

The dye molecule has a relatively elongated and rigid molecular structure. Many of the dyes prepared by the reaction of this invention and having the foregoing general formula are particularly useful in those areas where the absorption band lies at longer wavelengths. The $R_1$ and $R_2$ in the general formula for the tris-azo dyes and guest dichroic tris-azo dyes, represent substituted aromatic groups which are linked or joined to the basic dye structure or molecule by azo linkages or bonds. In accordance with preferred embodiments of the present invention, $R_1 = R_2$. However, it is within the scope of the present invention to provide dyes of the general formula wherein $R_1$ and $R_2$ comprise different substituted aromatic groups, and in fact $R_1$ and $R_2$ may represent any combination of the substituted aromatic or aryl groups of the present invention including substituted benzene groups and substituted naphthalene groups.

With respect to $R_1$ and $R_2$ in the general formula, the preferred amino-substituted quinoline is 8-aminoquinoline, i.e.,

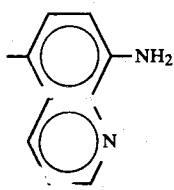

The preferred tetrahydroquinoline is the 1,2,3,4-tetrahydro moiety, i.e.,

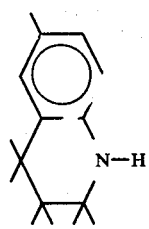

The preferred aminated aromatics of group III, i.e. of the formula:

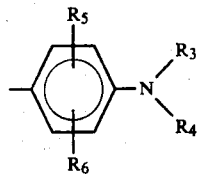

are those in which $R_3$, $R_4$, $R_5$ and $R_6$ are hydrogen or lower 1-4 carbon atom) alkyl. In more preferred embodiments, the aminated naphthalene or substituted naphthalene (IV) of the formula:

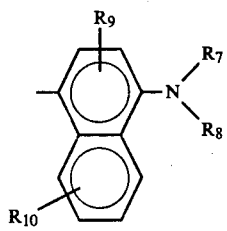

embraces groups wherein $R_7$ is alkyl or alkyl amine wherein the alkyl is about 1 to 6 carbon atoms, $R_8$ is hydrogen or alkyl having from about 1 to 6 carbon atoms wherein the alkyl is about 1 to 6 carbon atoms; and $R_9$ and $R_{10}$ are hydrogen. The preferred (V) substituted phenyl and (VI) substituted naphthalene are those groups shown in Table 1 below.

The dyes of the present invention may be synthesized in any suitable manner. In one preferred method of synthesis, 4-(p-aminophenylazo)-2,5-dimethylaniline is diazotized or tetrazotized. In those cases where only one terminal group comprising the aromatic or aryl group is desired or where two terminal groups comprising different aromatic groups are desired, the 4-(p-aminophenylazo)-2,5-dimethylaniline is diazotized, or if both terminal groups comprise the same substituted aromatic or substituted aryl group, then the 4-(p-aminophenylazo)-2,5-dimethylaniline is tetrazotized. The diazotization or tetrazotization is carried out in the conventional manner, for example, using sodium nitrite and dilute hydro-chloric acid, to form the diazonium or tetrazonium salt, respectively. The diazonium salt or tetrazonium salt is reacted with the appropriate aromatic amine, phenol, naphthol and the like to yield the tris-azo dyes of the present invention. If a tris-azo dye having two different terminal groups is desired, the reaction product of the diazonium salt and the appropriate aromatic amine, phenol, naphthol and the like, is again diazotized to form a diazonium salt which is, in turn, is reacted with a second aromatic amine, phenol, naphthol and the like, different from the first aromatic amine, phenol, naphthol and the like.

In general, the synthesis of the dyes of the general formula is carried out by diazotizing or tetrazotizing 4-(p-aminophenylazo)-2,5-dimethylaniline to form a diazonium or tetrazonium salt and thereafter coupling the respective diazonium or tetrazonium salt with the appropriate aromatic amine. The substituted aromatic compound couples to the diazonium or tetrazonium salt in the para position (relative to the substituted group on the aromatic compound). In those cases where the desired terminal group or terminal groups upon the dye molecule are phenol, substituted phenol, naphthol or substituted naphthol, and the like, the appropriate hydroxysubstituted aromatic compound or compounds are coupled with the diazonium or tetrazonium salt as produced above. Where the desired terminal group or terminal groups are aromatic amines, the appropriate substituted benzenes or substituted naphthalenes are coupled with the diazonium or tetrazonium salt. As explained above, various combinations of the foregoing may also be used in accordance with the present invention. The general synthesis is shown below using N-ethyl-1-naphthylamine as the coupling agent:

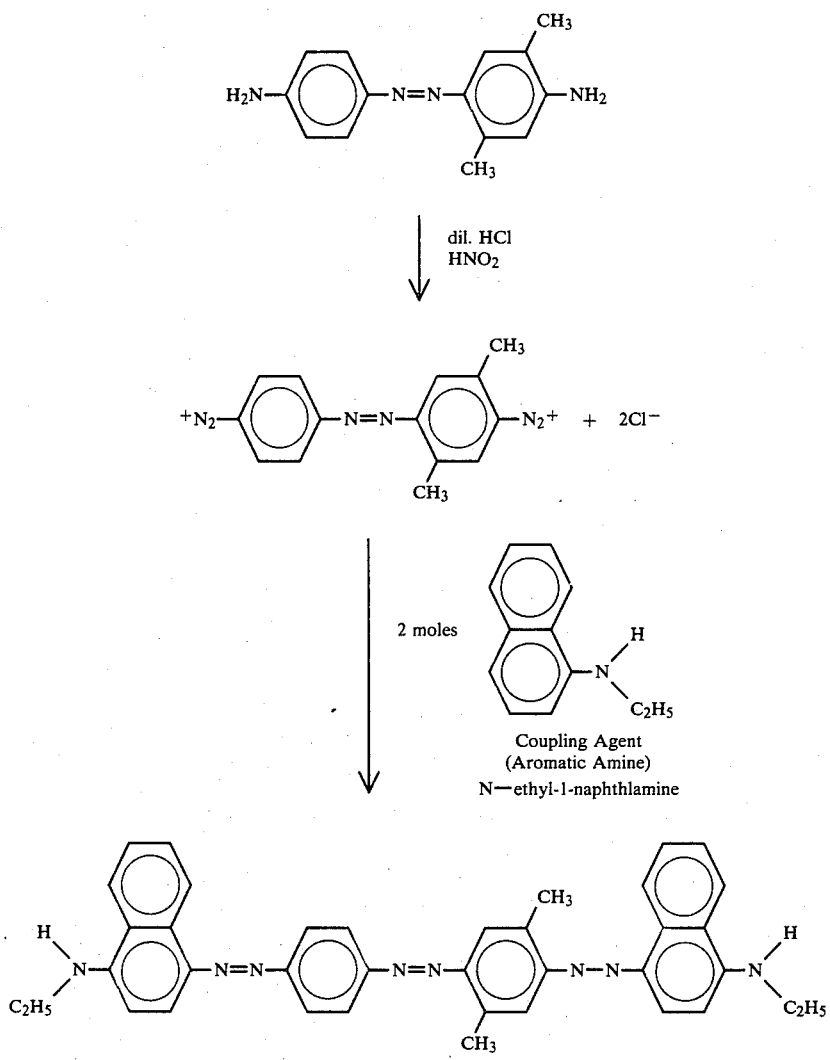

4,4'-bis(4-N-ethylaminonaphthylazo)-2,5-dimethylazobenzene.

In those cases where the terminal or end group on the dye molecule are hydroxy-substituted aromatic groups, such as the phenols and the naphthols, in the foregoing reaction, a typical coupling agent would be 2-methylphenol, viz:

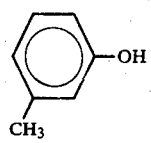

3-methylphenol
(Coupling agent)

or, 2-naphthol, viz:

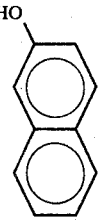

2-naphthol
(Coupling agent)

Other typical hydroxy-substituted aromatic compounds can be chosen by one skilled in the art. The coupling agents and substituted aromatic compounds are generally shown herein in the form or organic radicals.

In a more specific synthesis in accordance with the present invention, 4-(p-aminophenylazo)-2,5-dimethylaniline is dissolved in dilute hydrochloric acid, and the solution is cooled, for example, to about 0°-5° C. A solution of sodium nitrite in water is added dropwise to the cooled hydrochloric acid solution. After stirring the mixture for about 2-4 hours, excess nitrous acid is destroyed by the addition of a suitable agent, e.g., urea. The resulting tetrazonium salt is then filtered and added dropwise with stirring to a solution of the appropriate coupling agent, e.g., N-ethyl-1-naphthyl-amine, dissolved in acetic acid or other suitable solvent, and the reaction mixture is stirred for about 0.5–2.0 hours at a suitable coupling temperature, e.g., about 5° C.–25° C. The dye is isolated by diluting the mixture with water, neutralizing with potassium carbonate, collecting the precipitate and recrystalizing the precipitate from pyridine or other suitable agent. Naturally, other agents, solvents, neutralizers and recrystalization techniques can be substituted by one skilled in the art without undue experimentation. As discussed above, if both terminal groups of the dye molecule have the same substituted aromatic or aryl group, then the tetrazonium salt is formed by using 2 moles or more of sodium nitrite per mole of starting material and reacting the tetrazonium salt with two moles of the corresponding coupling agent, e.g., aromatic amine. If only one terminal group on the dye molecule has a substituted aromatic or aryl group, then the diazonium salt is formed by using only about 1 mole of sodium nitrite per mole of starting material and reacting the diazonium salt with only about one mole of the substituted aromatic coupling agent per mole of the diazonium salt. If both end groups of the dye molecule have different substituted aromatic or aryl groups, then the diazonium salt is formed by using only about 1 mole of sodium nitrite per mole of starting material and reacting the diazonium salt with about 1 mole of the substituted aromatic coupling agent to form a molecule having one type of terminal group, thereafter forming the diazonium salt of the molecule having one type of terminal group by using 1 mole of sodium nitrite per mole of the molecule having one type of terminal group and reacting the diazonium salt thereof with about 1 mole of another substituted aromatic coupling agent.

Examples of terminal groups for the tris-azo dyes of the present invention, i.e., example of $R_1$ and $R_2$ are shown in Table 1 below. Although the Table illustrates dyes wherein $R_1$ and $R_2$ are the same, it is to be understood that any combination of $R_1$ and $R_2$ may be used in accordance with the present invention. The color of the dye and the name of the appropriate coupling agent used in the synthesis above with the tetrazotized 4-(p-aminophenylazo)-2,5-dimethylaniline, are designated in Table 1 below. The dyes were synthesized and used with a commercial liquid crystal host designated as E-7 to give the color designated in the Table.

TABLE 1
EXAMPLES OF TRIS-AZO DYES OF THE PRESENT INVENTION

| DYE NO. | $R_1$ and $R_2$ | COUPLING AGENT | COLOR |
|---|---|---|---|
| 1. | —C₆H₄—N(H)(C₂H₅) | N—ethylaniline | Orange |
| 2. | 4-CH₃-C₆H₃—N(CH₃)₂ | N,N—dimethylamino-m-toluidine | Violet |
| 3. | —C₆H₄—N(CH₂CH₂CH₂CH₃)₂ | N,N—dibutylaniline | Red |
| 4. | naphthyl—N(CH₃)₂ | N,N—dimethyl-1-naphthylamine | Wine-Red |
| 5. | naphthyl—N(CH₂CH₃)₂ | N,N—diethyl-1-naphthylamine | Red-Violet |
| 6. | 2,5-(CH₃)₂-C₆H₃—NH₂ | 2,5-dimethylaniline | Orange |
| 7. | —C₆H₄—N(morpholine) | N—phenylmorpholine | Orange |
| 8. | —C₆H₄—N(piperidine) | N—phenylpiperidine | Orange |

TABLE 1-continued

EXAMPLES OF TRIS-AZO DYES OF THE PRESENT INVENTION

| DYE NO. | $R_1$ and $R_2$ | COUPLING AGENT | COLOR |
|---|---|---|---|
| 9. | ![structure: tolyl-N-piperazine with tetramethyl substituents, N-H] | N—phenylpiperazine | Yellow-Orange |
| 10. | ![structure: tolyl-N-N=C(CH3)-CH=C(CH3) pyrazole] | N—phenyl-3,5-dimethylpyrazole | Yellow |
| 11. | ![structure: tolyl-N(H)-naphthyl] | N—phenyl-1-naphthylamine | Purple-Blue |
| 12. | ![structure: tolyl-N(CH2CH3)2] | N,N—diethylaniline | Red |
| 13. | ![structure: tolyl-N-carbazole] | N—phenylcarbazole | Yellow |
| 14. | ![structure: methylquinoline-NH2] | 8-Aminoquinoline | Red |
| 15. | ![structure: methylnaphthyl-N(C2H5)2] | N,N—diethyl-1-naphthylamine | Red-Violet |
| 16. | ![structure: tolyl-NH-C(CH3)2-CH2-C(CH3)3 tetrahydroquinoline] | 1,2,3,4-Tetrahydroquinoline | Orange |
| 17. | ![structure: methylnaphthyl-N(H)-CH2CH2NH2] | N—(1-naphthyl)-ethylenediamine | Red |

TABLE 1-continued
EXAMPLES OF TRIS-AZO DYES OF THE PRESENT INVENTION

| DYE NO. | $R_1$ and $R_2$ | COUPLING AGENT | COLOR |
|---|---|---|---|
| 18. | OH, naphthyl group | 2-Naphthol | Violet |
| 19. | $CH_3$, $CH_3$, $-N(CH_3)_2$ substituted phenyl | N,N,3,5-tetramethylaniline | Red-Violet |
| 20. | N(H)(CH$_2$—CH$_3$) substituted naphthyl | N—ethyl-1-naphthylamine | Blue |
| 21. | OH substituted julolidine | 8-hydroxyjujolidine | Violet |

Other coupling agents which can be used to prepare the tris-azo dyes from 4-(p-aminophenylazo)-2,5-dimethyl-aniline in accordance with the present invention, and which can form $R_1$ and/or $R_2$ in the general formula representing the tris-azo dyes of the present invention, include julolidine, m-anisidine, aniline, 3-bromoaniline, N-benzylaniline, m-chloraniline, N-ethyl-N-methylaniline, 3-bromo-N,N-dimethylaniline, N,N-diethyl-1-naphthylamine, N,N-dimethyl-3-aminophenol, 3-chlorophenol and 1-naphthol. Naturally, it is within the purview of one skilled in the art to add to a considerable number of coupling agents to the foregoing list to provide tris-azo dyes in accordance with the general formula of the present invention and which fall within the generic description of $R_1$ and/or $R_2$.

The tris-azo dyes prepared in accordance with this invention can be used in any conventional manner. For example, they can be used alone or in combination with other dyes, modifiers or adjuvants to dye textiles (natural or man-made fibers) or to color plastic materials. The tris-azo dyes of this invention can be used alone or in combination with other dyes, modifiers or adjuvants to color liquid crystal displays. In preferred embodiments, the tris-azo dyes are used with liquid crystal host materials well-known in the art to improve the color of the liquid crystal composition for use in a liquid crystal display. When the tris-azo dyes of this invention are used with a liquid crystal host, they are called guest dyes, and they are dissolved in the host liquid crystal material, that is, the guest tris-azo dye is soluble in the host liquid crystal material. Many of the tris-azo dyes require mild heat, e.g., above ambient to 110° C. to promote their dissolution in the host liquid crystal.

Any liquid crystal host material may be used in accordance with the present invention. In those embodiments of the present invention wherein the tris-azo dichroic dye material is used as a guest dye in a host liquid crystal material it is not critical which of the many well known liquid crystal materials or combinations thereof may be used as long as the tris-azo dye materials of the present invention are soluble in the host liquid crystal material and as long as the tris-azo dye or dyes of the present invention are compatible with or have no adverse effect upon the host liquid crystal material. In preferred liquid crystal compositions of the present invention, the host liquid crystal material is a nematic liquid crystal of positive or negative dielectric anisotropy, a cholesteric liquid crystal or positive or negative dielectric anisotropy and mixture thereof, that is, mixture of nematic liquid crystals and cholesteric liquid crystal modified with other optically active compounds.

Any conventional liquid crystal host material can be used with the tris-azo dyes of the present invention. The liquid crystal hosts can be selected by one skilled in the art depending upon the electro-optic effect to be utilized. Nematic liquid crystals include the biphenyl liquid crystals such as E7 and E8 from BDH, Ltd.

Biphenyl liquid crystal E-7 is a eutectic of the following general formula:

wherein R is a mixture of $C_5H_{11}$, $C_7H_{15}$, $C_8H_{17}O$ and

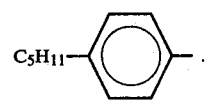

Other nematic liquid crystals include p-cyanophenyl p'-(p-alkyl)benzoate esters available from Merck Co. and Hoffmann-LaRoche Co., phenylcyclohexanes and azoxy mixtures available from Merck Co., alkoxybenzylidene anils such as those having the structural formula:

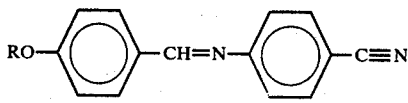

wherein OR is an alkoxy radical preferably having from 1 to 7 carbon atoms or an acyloxy radical having from 2 to 7 carbon atoms, p-anisylidene-p'-n-butylaniline, p-anisylidene-p'-aminophenyl-butyrate, p-(p'-methoxyphenylazoxy)butylbenzene, p-(p'-ethoxyphenylazo)-phenylheptanoate, p-n-hexylbenzoic acid-p'-n-hexyloxyphenyl ester, and other liquid crystal materials, such as the esters disclosed in U.S. Pat. No. 3,984,344, p-n-hexylbenzylidene-p'-amino-benzonitrile, p-capryloxybenzylidene-p'-aminobenzonitrile, p-cyanophenyl-p'-n-heptylbenzoate, p-cyanobenzylidine-p'-n-butoxyaniline, p-cyanobenzylidene-p'-aminophenylvalerate, p-azoxyanisole, butyl-p-(p'-ethoxyphenoxycarbonyl)phenylcarbonate, p(p'-ethoxyphenylazo)phenylheptanoate, and the like. Another class of liquid crystal materials has the general formula:

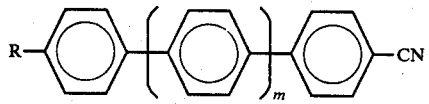

wherein R is an alkyl or alkoxy group and m=0 or 1, at least one of said compounds being cyanobiphenyl wherein m=0. Generally, nematic liquid crystals fall within the class of chemical compounds having the general formula:

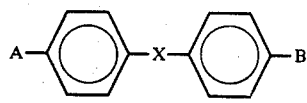

wherein X is an azomethine linkage of the Schiff base class, X is an ester, vinylene, acetylene, azo or azoxy, or X is merely a single bond connecting the two benzene rings; and A and B are $C_nH_{2n+1}$ (alkyl group); $C_nH_{2n+1}O$ (alkoxy group); or $C_nH_{2n+1}COO$ (ester group). Cholesteric liquid crystals can be pure compounds such as derivatives of cholesterol or noncholesteric materials. These are characterized by optical activity arising from the absence of molecular symmetry.

In accordance with the present invention, it is not critical how much of the dye is present in the host liquid crystal as long as the dye is soluble therein. In preferred embodiments, about 0.05% by weight to about 1.0% by weight, and more preferably greater than about 0.5% by weight, (based upon the weight of the liquid crystal host material) of the dye of this invention or mixtures of dyes of this invention are present in the host liquid crystal. One skilled in the art can adjust the amount of azo dye as desired and can determine the amount required for maximum absorption at a particular wavelength. The upper limit of the amount (concentration) of dye varies with the solubility of the particular dye in the host liquid crystal. The amount of guest dichroic tris-azo dye of the present invention in the host liquid crystal material is that amount up to the limit of maximum solubility in the host of tris-azo dye required to color, tint or shade the host liquid crystal, required to add to the color of the host liquid crystal material, or required to contribute to the color of a mixture of dyes used in the host liquid crystal material, e.g., the use of the tris-azo dye or dyes of this invention with dyes of other colors to improve the "blackness" of guest dyes in the host liquid crystal or to improve the intensity or contrast of any single color where more saturated colors are desired, especially for those dyes where the absorption band lies at longer wavelengths.

In liquid crystal display technology, there are relatively few dyes which are soluble in liquid crystal host materials. It is important to provide more soluble dyes of longer wavelengths to improve blue liquid crystal displays and to improve the "blackness" of dichroic dye mixtures made from various colors. For example, the blue tris-azo dyes of the invention, when mixed with other appropriate dyes, for example, yellow azo dyes, in a liquid crystal, have improved "blackness". It is for this reason that the use of the blue dye or dyes of this invention with dyes of other colors improves the "blackness" of guest dyes in host liquid crystals. The guest blue tris-azo dichroic dyes of this invention are particularly useful in black liquid crystal displays because improved black liquid crystal materials can be obtained by mixing dichroic dyes of various colors in proper proportions to obtain a material which absorbs radiation in the spectral range of about 400–700 nm, and the blue tris-azo dyes of this invention substantially improve the absorption in the region above 600 nm of such dye mixtures. Naturally, liquid crystal displays containing dichroic dyes of the other colors of the present invention can also be used in the dichroic dye mixtures and can be used as guest dyes for black liquid crystal materials or various other colors of liquid crystal materials. Thus, in accordance with the present invention, the method of making black dichroic dyes or black dichroic liquid crystal displays is achieved by providing a host liquid crystal material and mixing therewith dichroic dyes of various colors in suitable proportions to obtain a material which absorbs radiation in the spectral range of about 400–700 nm wherein the dichroic dyes of various colors include at least one blue dye having the general formula described above for the tris-azo dyes of the present invention and having maximum (peak) absorption greater than about 580 nm. The appropriate mixture of dichroic dyes of various colors in suitable proportions to obtain a material which absorbs radiation in the spectral range of about 400–700 nm, and which approaches a substantially black appearance in color, is within the purview of one skilled in the art, and the improvement of the present invention is directed to the use of one or more of the blue tris-azo dyes having a maximum or peak absorption greater than about 580 nm to improve the "blackness" of the dichroic dye mixture made from various colors. For example, the blue azo dyes of this invention, when mixed with appropriate yellow azo dyes in a liquid crystal, produce an improved bluish-black displays are substantially improved in a biphenyl liquid crystal. The blue tris-azo dyes of this invention used in such mixtures, have substantially high order parameters (S) generally at least 0.70 and above, to insure satisfactory brightness and contrast ratio.

In accordance with the present invention, it has also been discovered that, in general, the tris-azo dyes having substituted aromatic terminal groups, e.g., aromatic amines, substituted aromatic amines, phenols, naphthols, substituted phenols and substituted naphthols, have increased solubility over the prior art dyes of U.S. Pat. No. 4,122,027. It has been found that generally, in accordance with the present invention, the methyl group in the 2- and 5-position on one of the benzene rings joined by two azo groups in the dye molecule increases the solubility of the dye having the general formula described above for the present invention and having terminal groups of substituted aromatic groups, such as aromatic amines, substituted aromatic amines, phenols, naphthols, substituted phenols, and substituted naphthols, and the like.

The following specific examples describe the tris-azo dyes and the liquid crystal displays of the present invention. They are intended for illustrative purposes only and should not be construed as a limitation.

EXAMPLE I

Dye No. 20 in Table 1 above, was synthesized by tetrazotizing 4-(p-aminophenylazo)-2,5-dimethylaniline and coupling the tetrazonium salt formed thereby with the appropriate aromatic amine to form the tris-azo dye, 4-(p-amino-phenylazo)-2,5-dimethylaniline (2.4 grams, 10 millimoles) was dissolved in 60 ml of 9% hydrochloric acid, and the solution was cooled to about 0°–5° C. A solution of sodium nitrite (1.5 gram, 22 millimoles) in 5.0 ml of water was added dropwise to the solution. After stirring the mixture at 0°–5° C. for about 3 hours, excess nitrous acid formed from the reaction was destroyed with urea. The resulting tetrazonium salt was then filtered and added dropwise with stirring to a solution of N-ethyl-1-naphthylamine (3.4 grams, 20 millimoles) dissolved in 50 ml of acetic acid at about 10° C., and the reaction mixture was stirred for about 1 hour at about 10° C. The resulting dye was isolated by diluting the mixture with water, neutralizing with potassium carbonate, collecting the precipitate and recrystalizing the precipitate from pyridine. The dye 4,4'-bis(4-N-ethylaminophthylazo)-2,5-dimethylazobenzene has the characteristics enumerated in Table 1 above, a λ max of about 582 nm and an order parameter (S) of 0.77 in E-7 (compared to 0.75 for the corresponding dye in which the $C_5$ substituent is methoxy).

EXAMPLE II

The other dyes in Table 1 above were prepared in accordance with the procedure and reaction conditions set forth in Example I above, from the same tetrazonium salt by allowing the salt to react with the appropriate aromatic compound, e.g., aromatic amine, substituted aromatic amine, phenol, substituted phenol, naphthol, substituted naphthol and the like. The appropriate aromatic group used in place of the N-ethyl-1-naphthylamine of Example I above was used in the reaction. These aromatic compounds which were reacted with the tetrazonium salts, are described in Table 1 above for each of the respective dyes numbered 1 through 21. The characteristic colors of the dyes in the specified liquid crystal host material are described in Table 1.

EXAMPLE III

To prepare a liquid crystal display, the blue trisazo dye No. 20 in Table 1 above was dissolved at a concentration of about 0.5% in nematic liquid crystal E-7 obtained from E. Merck Associates. The liquid was placed in a test cell between glass plates whose surfaces in contact with the solution had been previously rubbed unidirectionally. The test cell was a conventional liquid crystal cell having a distance of about 12 microns between the glass plates and filled with the above dichroic liquid crystal composition. The resulting cell had a blue color when illuminated with properly oriented polarized light in the absence of a voltage. The blue color substantially disappeared upon the application of a voltage of about 15 volts.

EXAMPLE IV

Two liquid crystal test cells similar to the one described in Example III above were prepared and filled with liquid crystal compositions in which the blue dye No. 22 in Table 1 above was dissolved in nematic liquid crystal hosts ROTN-404 supplied by Hoffmann-LaRoche Company and Licristal 1132, supplied by E. Merck Associates, respectively. ROTN-404 liquid crystal is a biphenyl-pyrimidine of positive dielectric anisotropy having a temperature range of −10° C. to 105° C., and Licristal 1132 is a phenylcyclohexane having a dielectric anisotropy of 10 and a temperature range of −6° to 70° C. Results similar to those described in Example III above were obtained upon the application of voltage.

EXAMPLE V

To prepare a liquid crystal display incorporating a cholesteric liquid crystal host material, 0.5% by weight of the blue dye of Example I was dissolved in a cholesteric host material ROTN-104 containing about 2.5–7.5% by weight of optically active compound CB-15, supplied by E. Merck Associates. CB-15 is an optically active chiral dopant, 4-cyano-4'-(2-methyl)butyl-biphenyl having the formula:

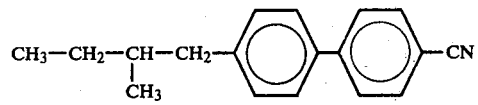

The cell was blue in the absence of a voltage and colorless upon the application of a voltage when viewed in unpolarized light.

The utility of the tris-azo dyes of this invention has been demonstrated. When used alone, the dyes can be used to provide colored liquid crystal displays, or they can be used as additives in conjunction with other dyes to provide various colored dyes in liquid crystal displays, or to provide improved black dyes for black dichroic displays when used with liquid crystals. The dyes of the present invention can also be used as additives with other dyes to obtain unusual color effects in liquid crystal displays. Furthermore, the tris-azo dyes of the present invention have been shown to be useful with a wide variety of liquid crystal compositions and are compatible with known liquid crystals, such as Schiff base, esters, azoxy, biphenyl, phenylcyclohexanes, biphenyl/pryimidine-type liquid crystals and the like. The novel tris-azo dyes of the present invention can also be used for the dyeing of textiles, coloring of plastics or the coloring of any other media conventionally colored by azo dyes.

While other modifications of the invention and variations thereof which may be employed within the scope of the invention have not been described, the invention is intended to include such modifications as may be embraced within the following claims.

What is claimed is:

1. A liquid crystal composition for use in a liquid crystal display, comprising host liquid crystal material and at least one guest dichroic dye having a maximum absorption greater than about 580 nm and having an order parameter of at least 0.70 as dissolved in said liquid material of the general formula,

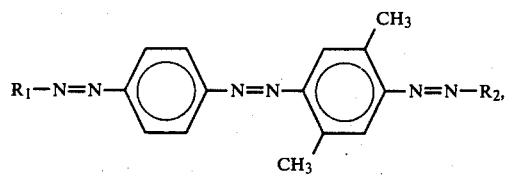

where $R_1$ and $R_2$ are selected from aromatic amine groups of the formula

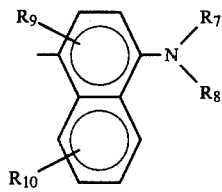

$R_7$ is selected from the class consisting of hydrogen, $C_{(1-6)}$ alkyl, aryl, arylalkyl and alkyl amine, $R_8$ is selected from the class consisting of hydrogen, $C_{(1-6)}$ alkyl, alkyl amine, alkoxy and halogen, and $R_9$ and $R_{10}$ are selected from the class consisting of hydrogen, $C_{(1-3)}$ alkyl, alkoxy and halogen.

2. The liquid crystal composition of claim 1, wherein the host material is a nematic liquid crystal or a cholesteric liquid crystal.

3. The liquid crystal composition of claim 2, wherein about 0.05% by weight to about 1.0% by weight (based upon the weight of the liquid crystal) of dichroic dye is dissolved in the host liquid crystal.

4. The liquid crystal composition of claim 2, wherein $R_1 = R_2$.

5. The liquid crystal composition of claim 4, wherein $R_7$ is hydrogen, methyl or ethyl, and $R_8$ is methyl, ethyl, aminoethyl or phenyl.

6. The liquid crystal composition of claim 4, wherein said guest dichroic dye is 4,4'-bis(4-N-ethylaminonaphthylazo)-2,5-dimethylazobenzene.

7. The liquid crystal composition of claim 4, wherein said host liquid crystal material contains at least one other guest dichroic dyes so as to realize a given color.

8. The liquid crystal composition of claim 7, wherein said guest dichroic dye and other dichroic dyes are in proportion to realize a black display.